(12) United States Patent
Inoue et al.

(10) Patent No.: US 11,057,294 B2
(45) Date of Patent: Jul. 6, 2021

(54) ROUTE CONTROL METHOD AND ROUTE SETTING DEVICE (71) Applicants: NIPPON TELEGRAPH AND TELEPHONE CORPORATION, Tokyo (JP); TOHOKU UNIVERSITY, Sendai (JP)

(72) Inventors: Takeru Inoue, Yokosuka (JP); Osamu Akashi, Yokosuka (JP); Kimihiro Mizutani, Musashino (JP); Nei Kato, Sendai (JP); Zubair Md Fadlullah, Sendai (JP)

(73) Assignees: NIPPON TELEGRAPH AND TELEPHONE CORPORATION, Tokyo (JP); TOHOKU UNIVERSITY, Sendai (JP)

( * ) Notice: Subject to any disclaimer, the term of this patent is extended or adjusted under 35 U.S.C. 154(b) by 0 days.

(21) Appl. No.: 16/636,158

(22) PCT Filed: Jul. 24, 2018

(86) PCT No.: PCT/JP2018/027672
§ 371 (c)(1),
(2) Date: Feb. 3, 2020

(87) PCT Pub. No.: WO2019/026684
PCT Pub. Date: Feb. 7, 2019

(65) Prior Publication Data
US 2020/0177495 A1 Jun. 4, 2020

(30) Foreign Application Priority Data
Aug. 4, 2017 (JP) .............................. JP2017-151199

(51) Int. Cl.
*H04L 12/751* (2013.01)
*H04L 12/707* (2013.01)
(Continued)

(52) U.S. Cl.
CPC .............. *H04L 45/08* (2013.01); *H04L 45/22* (2013.01); *H04L 45/70* (2013.01); *H04L 47/122* (2013.01); *H04L 47/125* (2013.01)

(58) Field of Classification Search
CPC ......... H04L 45/00; H04L 45/08; H04L 45/22; H04L 45/70; H04L 47/00; H04L 47/10–127
See application file for complete search history.

(56) References Cited

U.S. PATENT DOCUMENTS 6,721,413 B1    4/2004  Kawakami
8,869,276 B2 *  10/2014 Crovella ................. H04L 43/16
                                                      726/23
(Continued)

FOREIGN PATENT DOCUMENTS

JP          4-13343      1/1992
JP       2000-201178     7/2000

OTHER PUBLICATIONS

International Preliminary Report on Patentability dated Feb. 13, 2020 in corresponding International PCT Patent Application No. PCT/JP2018/027672, 11 pages.
(Continued)

*Primary Examiner* — Boris D Grijalva Lobos
(74) *Attorney, Agent, or Firm* — Ohlandt, Greeley, Ruggiero & Perle, L.L.P.

(57) ABSTRACT

The route control method and the route setting device according to the present invention is configured such that a learning unit is prepared for each path, a function form of the learning unit of the path in forwarding a packet is adjusted by having traffic information (packet arrival rate, queue length, and the like) and congestion information (congested or not congested) of this path as teacher data, and when this path is congested, changing to a path with an output of no congestion among the learning units is executed. Thus, since
(Continued)

the learning unit optimizes the function form, changing to an alternative path can be immediately executed even when the congestion incidentally occurs on the path.

6 Claims, 6 Drawing Sheets

(51) Int. Cl.
*H04L 12/721* (2013.01)
*H04L 12/803* (2013.01)

(56) References Cited

U.S. PATENT DOCUMENTS

| | | | | |
|---|---|---|---|---|
| 2007/0002748 A1* | 1/2007 | Nakata | ............... | H04L 45/00 370/238 |
| 2009/0003217 A1* | 1/2009 | Ferra | ............... | H04L 41/0853 370/238 |
| 2013/0159548 A1* | 6/2013 | Vasseur | ............... | H04L 45/125 709/239 |
| 2014/0222997 A1* | 8/2014 | Mermoud | ............... | H04L 41/147 709/224 |
| 2014/0269303 A1* | 9/2014 | Toy | ............... | H04L 43/0852 370/235 |
| 2014/0313903 A1* | 10/2014 | Kikuzuki | ............... | H04W 28/0236 370/238 |
| 2015/0074283 A1* | 3/2015 | Karthikeyan | ............... | H04L 45/12 709/227 |
| 2015/0295855 A1* | 10/2015 | Karthikeyan | ............... | H04L 43/0876 370/232 |
| 2015/0295856 A1* | 10/2015 | Karthikeyan | ............... | H04L 47/822 370/230 |
| 2015/0319076 A1* | 11/2015 | Vasseur | ............... | H04L 43/0852 370/238 |
| 2015/0334030 A1* | 11/2015 | Vasseur | ............... | H04L 47/115 370/230 |
| 2016/0043932 A1* | 2/2016 | Karthikeyan | ............... | H04L 45/123 370/390 |
| 2016/0057061 A1* | 2/2016 | Avci | ............... | H04L 43/50 370/235 |
| 2018/0176134 A1* | 6/2018 | Pignataro | ............... | H04L 47/12 |
| 2018/0270305 A1* | 9/2018 | Tignor | ............... | H04L 67/327 |
| 2018/0309636 A1* | 10/2018 | Strom | ............... | H04L 41/0813 |
| 2018/0359172 A1* | 12/2018 | Yadav | ............... | H04L 45/70 |

OTHER PUBLICATIONS

N. Kate, Z. M. Fadlullah, B. Mao, F. Tang, O. Akashi, T. Inoue, and K. Mizutani, "The Deep Learning Vision for Heterogeneous Network Traffic Control: Proposal, Challenges, and Future Perspective", in IEEE Wireless Communications (WCM), Jun. 2017, available online, DOI:10.1109/MWC.2016.1600317WC, pp. 146-153.

Z. Fadlullah, F. Tang, B. Mao, N. Kato, O. Akashi, T. Inoue, and K. Mizutani, "State-of-the-Art Deep Learning. Evolving Machine Intelligence Toward Tomorrow's Intelligent Network Traffic Control Systems", in IEEE Communications Surveys and Tutorials, DOI:10. 1109/COMST.2017.2707140, pp. 1-24.

B. Mao, Z. M. Fadlullah, F. Tang, N. Kato, 0. Akashi, T. Inoue, and K. Mizutani, "Routing or Computing? The Paradigm Shift Towards Intelligent Computer Network Packet Transmission Based on Deep Learning", IEEE Transactions on Computers, available online, DOI:10.1109/TC.2017.2709742, pp. 1-15.

International Search Report dated Oct. 9, 2018 in corresponding PCT International Patent Application No. PCT/JP2018/027672, 2 pgs.

* cited by examiner

Algorithm 1: Algorithm of path learning setting server assigned to path between routers $s$ and $d$

Input: Set $P_{sd}$ of paths between $s$ and $d$

// Preprocessing step

1   $X \leftarrow 0$ // Initialize time-series data of traffic
2   foreach $p \in P_{sd}$ do
3      $L_p.\text{init}()$ // Initialize learning unit of path $p$
4      $Y_p \leftarrow 0$ // Initialize time-series data of congestion state of path $p$
5   $p^* \leftarrow \arg\min_{p \in P_{sd}} p.length$ // Select shortest path from $P_{sd}$
6   Set path $p^*$ for packets of $s$-$d$ // Set path $p^*$ for packets from $s$ to $d$
7   foreach $t_0 \in T$ do // Periodic process
       // Training step
8      $x_0 \leftarrow$ traffic statistics from all routers $R$
9      $y_0 \leftarrow$ Is $p^*$ congested ?
10    $X \leftarrow \{x_0\} \cup X$
11    $Y_p \leftarrow \{y_0\} \cup Y$
12    $L_{p^*}.\text{learn}(X,Y)$ // Learning unit of path $p^*$ executes training
       // Predicting step
13    if $y_0$ *is congested* then
14      $p^* \leftarrow$ available path in $P_{sd}$ under $x_0$
15      set $p^*$ for packets of $s$-$d$

| ENTRANCE/EXIT | r0 | r1 | r2 |
|---|---|---|---|
| r0 | | 34 | 23 |
| r1 | 9 | | 25 |
| r2 | 98 | 7 | |

ROUTE CONTROL METHOD AND ROUTE SETTING DEVICE

TECHNICAL FIELD

This disclosure relates to a route control method and a route setting device in a communication network configured not only to forward a packet to a destination but also to have an advanced purpose such as Traffic Engineering (TE).

BACKGROUND ART

In the prior art (see Non-patent Documents 1 to 3, for example), it has been aimed that an existing route control method such as Open Shortest Path First (OSPF) is learned in advance to imitate its performance.

In this prior art, machine learning is applied to setting control of a path. The machine learning means a technique such as deep neural network recently attracting attention. In this description, the machine learning is defined as follows. Assume that some pairs of an argument (or input) xi and a return value (or output) yi are given (i is any natural number). At this time, a function ƒ satisfying yi=ƒ(xi) is constituted. Here, an entity off ƒ is referred to as a learning unit. When input-output pairs X=(x0, x1, . . . ) and Y=(y0, y1, . . . ) referred to as teacher data are given, the learning unit uses them to automatically learn the function ƒ (also referred to as train). After the learning, the learning unit can predict a probable y'=ƒ(x') also to x' not included in the teacher data.

In the prior art, the existing route control method is used to preliminarily create the teacher data. In the existing route control method, when the number of arrival packets at each router is given, paths of each packet are determined while control messages are exchanged among the routers. In the prior art, the teacher data having traffic information as xi and path for each destination as yi is used to learn the function ƒ representing the correspondence of them. When a traffic close to the preliminarily created teacher data occurs, an adequate path can be determined by imitating the existing route control method. However, for the traffic far from the teacher data, there is a risk that an inappropriate path is selected to cause congestion.

Non-Patent Document

[Non-patent Document 1] N. Kato, Z. M. Fadlullah, B. Mao, F. Tang, O. Akashi, T. Inoue, and K. Mizutani, "The Deep Learning Vision for Heterogeneous Net-work Traffic Control. Proposal, Challenges, and Future Perspec-tive", in IEEE Wireless Communications (WCM), available online, doi:10.1109/MWC.2016.1600317WC.

[Non-patent Document 2] Z. Fadlullah, F. Tang, B. Mao, N. Kato, O. Akashi, T. Inoue, and K. Mizutani, "State-of-the-Art Deep Learning. Evolving Machine Intelligence Toward Tomorrows Intelligent Network Traffic Control Systems", in IEEE Communications Surveys and Tutorials , vol. PP, no. 99, pp. 1-1, doi.10.1109/COMST.2017.2707140

[Non-patent Document 3] B. Mao, Z. M. Fadlullah, F. Tang, N. Kato, O. Akashi, T. Inoue, and K. Mizutani, "Routing or Computing? The Paradigm Shift Towards Intelligent Computer Network Packet Transmission Based on Deep Learning", IEEE Transactions on Computers, available online, doi.10.1109/TC.2017.2709742.7

DISCLOSURE OF THE INVENTION

Problems to be Solved by the Invention

Then, there has been a problem that it is difficult to set a path to avoid an incidental congestion position. Therefore, to solve the above-described problem, the present invention has an object to provide a route control method and a route setting device configured to predict and avoid an incidental congestion position in real time without an existing route control technique such as OSPF.

Solutions to the Problems

To achieve the above-described object, the route control method and the route setting device according to the present invention is configured to perform machine learning in real time.

Specifically, the route control method according to the present invention includes:

a preprocessing step of setting a path for each router in a communication network to prepare a learning unit for each of the paths;

a training step of collecting traffic information of every router and congestion information of a path currently forwarding a packet and adding to accumulation of the past traffic information and the past congestion information of each of the paths set in the preprocessing step, and performing machine learning for each of the paths having the accumulation as teacher data; and a predicting step of setting one path predicted not to be congested among congestion predictions based on results of the machine learning performed to the given traffic information in the training step for the router.

The route setting device according to the present invention includes:

a learning unit prepared for each path set for each router in a communication network;

a training unit configured to collect traffic information of every router and congestion information of a path currently forwarding a packet and add to accumulation of the past traffic information and the past congestion information of each of the set paths, and train each of the learning units having the accumulation as teacher data; and a predicting unit configured to give the traffic information to every learning unit and perform a path prediction setting to set one path predicted not to be congested among congestion predictions output from the learning unit for the router.

In this route control method and this route setting device, the learning unit is prepared for each path, and any traffic information including the number of arrival packets at each router, an average queue length of each router, and a packet discard rate of each link is defined as X and any congestion information of the path including a forward delay period and a threshold determination of forward delay is defined as Y. There is a difference in that while Y is the path of each destination in the prior art, Y is the congestion information of the path in the present invention. In this route control method and this route setting device, the learning unit is trained while X and Y are collected in real time, and a congestion state y' of the path is predicted for new traffic information x'. Then, when the currently used path is congested or predicted to be congested, this route control method and this route setting device change it to a path where the congestion is not predicted.

Thus, since the learning unit optimizes the function form, this route control method and this route setting device can immediately change it to an alternative path even when the congestion incidentally occurs on the path. Accordingly, the present invention can provide the route control method and the route setting device configured to predict and avoid an incidental congestion position in real time without an existing route control technique such as OSPF.

The route control method according to the present invention is configured such that after the preprocessing step, a shortest path is selected among the set paths to start the training step, and the training step and the predicting step are repeated for a predetermined time. At an early stage of the machine learning, to form the function form of the learning unit, first, the traffic is forwarded to the shortest path to collect the teacher data. Then, the traffic is forwarded while changing to various paths depending on that result, and thus the teacher data is further collected. Thus, the training step and the predicting step are repeated to form the function form of the learning unit.

The route control method according to the present invention is configured such that a path other than the one path predicted not to be congested in the predicting step for the predetermined time with a predetermined probability is set for the router. Since the information of overall network cannot be collected when the traffic concentrates in a specific path group, the traffic is preferred to be forwarded to the path other than the path predicted in the predicting step as necessary.

Effects of the Invention

The present invention can provide the route control method and the route setting device configured to predict and avoid the incidental congestion position in real time without the existing route control technique such as OSPF.

DESCRIPTION OF EMBODIMENTS

The embodiment of the present invention will be described by referring to the accompanying drawings. The embodiment described below is merely a working example of the present invention, and the present invention is not limited to the following embodiment. Note that components having the identical reference numerals in this description and the drawings mutually denote the identical components.

[Outline of the Present Invention]

A route control method and a route setting device of this embodiment perform machine learning in real time. To perform congestion prediction for each path, a learning unit is prepared for each path. A route setting device is prepared for each pair of a source point and a destination point, and a learning unit having the source point and the destination point as an identical point is managed by the route setting device. The route setting devices may be installed to be gathered at one position, or may be installed for each source router.

Here, training and prediction of the learning unit will be described for a certain path. Time-series data of a network (NW) indicated by a three-dimensional vector (C, T, R) will be used with an input X to the learning unit. C ($=c_0, c_1, \ldots, c_{M-1}$) is a state vector of NW, and M indicates the number of types of the state vector of NW. As elements of the state vector, any traffic information including a queue length of the router, the number of packet arrivals, and a packet discard rate corresponds.

T ($=t_0, t_{-1}, \ldots, t_{1-H}$) is a vector constituted of times of H slots that observes the NW state, and $t_0$ indicates the latest (current) NW state.

R ($=r_0, r_1, \ldots, r_i, \ldots, r_{N-1}$) indicates a set of routers in NW, and represents the NW constituted of N routers.

Figure 1:
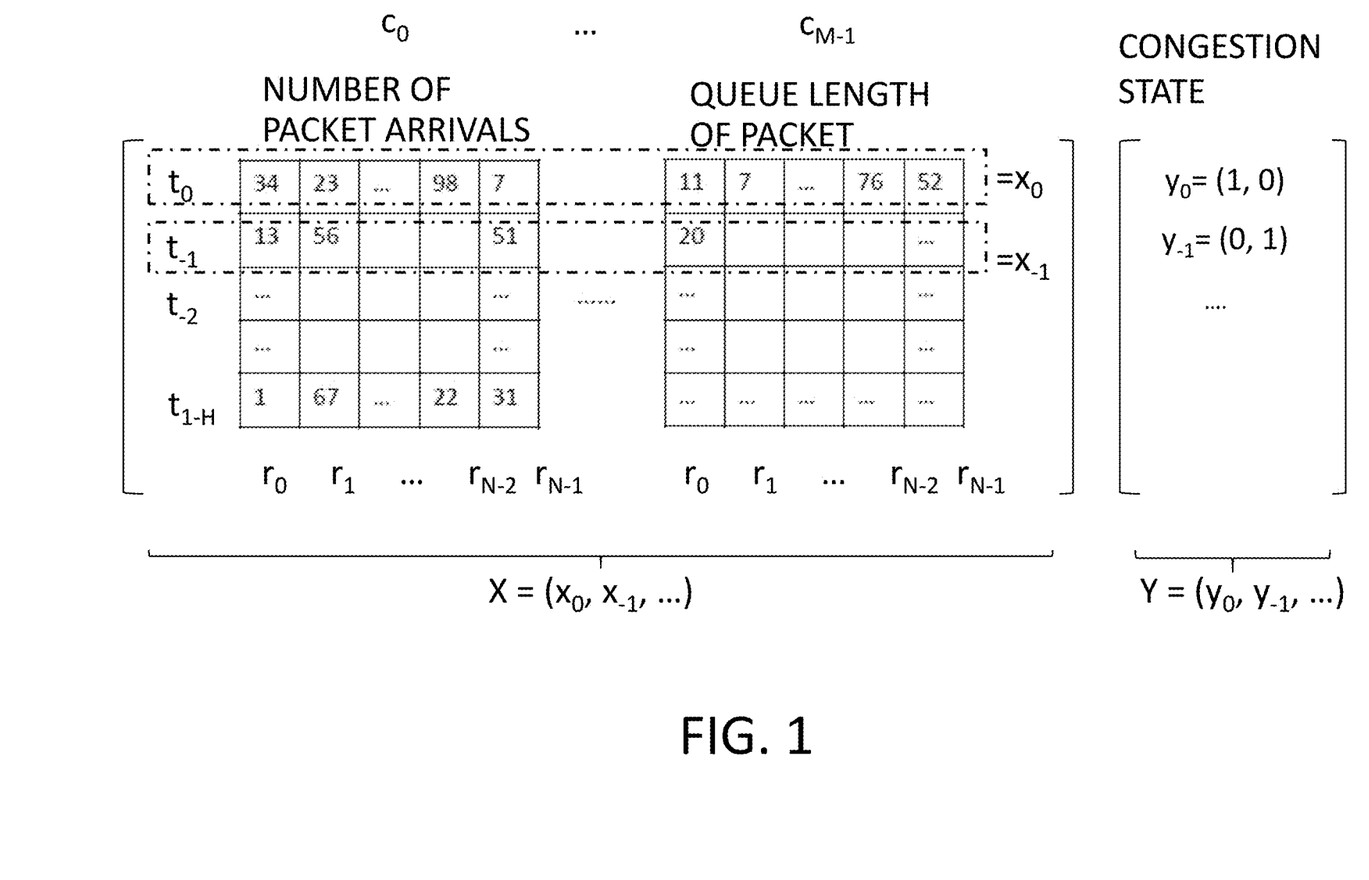
FIG. 1 is a drawing describing information input to a learning unit of a route setting device according to the present invention.

$c_0$ in FIG. 1 indicates the number of packet arrivals of each router ($r_0, r_1, \ldots$) for each time ($t_0, t_{-1}, \ldots$) in matrix form. $c_{M-1}$ in FIG. 1 similarly indicates the queue length in matrix form. The bundle of identical rows (time $t_i$) for all state types is defined as $x_i$, and the bundle of all the rows is defined as X=($x_0, x_{-1}, \ldots$). $x_0$ is the latest argument, and $x_{-1}, x_{-2}, \ldots$ are past arguments.

The "congestion state" in FIG. 1 is a congestion state $y_i$ of this certain path observed at each time $t_i$. For example, the training unit determines whether to be congested or not depending on whether the delay period of the set path exceeds the preset threshold or not, and indicates the determination result in binary. In FIG. 1, the case where the training unit determines the congestion is indicated as (1, 0), and the case of the determination of not congested is indicated as (0, 1). They are aggregated into Y=($y_0, y_{-1}, \ldots$). $y_0$ is the latest return value, and $y_{-1}, y_{-2}, \ldots$ are the past return values. While the determination result is the binary of congested and not congested in this example, the determination result may be ternary or more by preparing their intermediate value.

While the learning unit of a certain path is described here, it should be noted that X is information on every router. That is, the learning unit of one path also uses traffic information of the router not on this path for prediction. Meanwhile, Y is the congestion state of the certain path described here, and does not include the congestion states of other paths.

Figure 2:
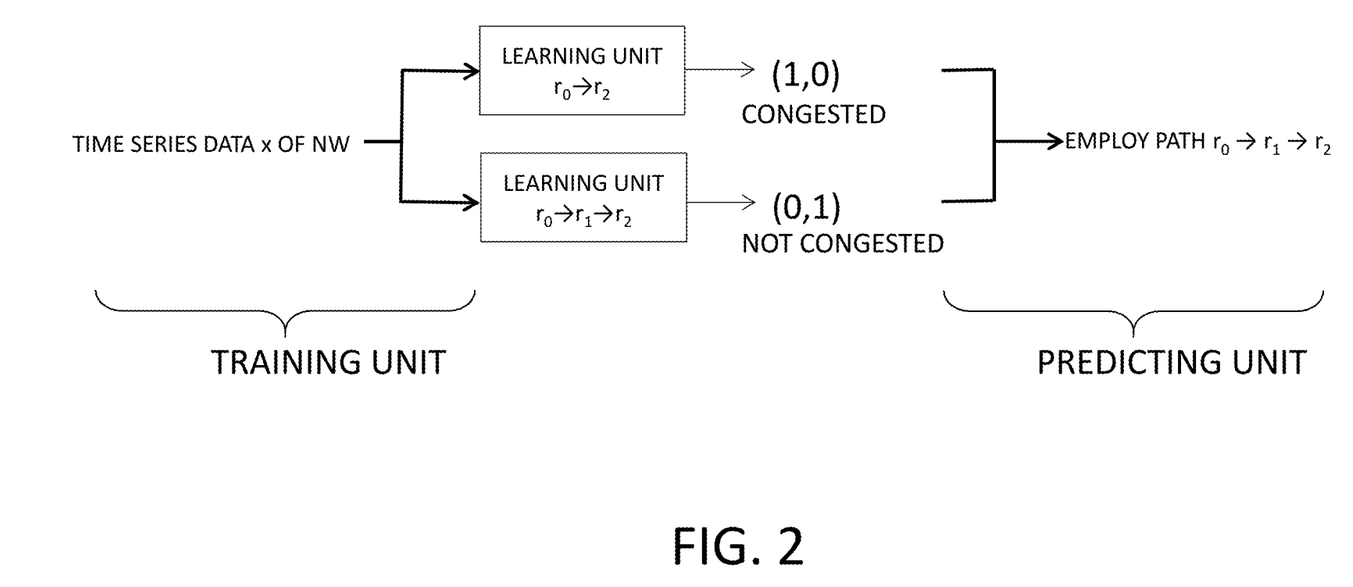
FIG. 2 is a drawing describing a route control performed by the route setting device according to the present invention.

When the teacher data (X and Y) is given to the learning unit, the learning unit creates a function form from X and Y. A predicting unit uses the function form created by the learning unit to predict the congestion of the path. A description will be given of the prediction at the latest time $t_{s+1}$ using FIG. 2. When the state vector $x_{s+1}$ of NW at the latest time $t_{s-1}$ is given to each learning unit, the learning units each use the function form to output (return value $y_{s+1}$) whether the path assigned to the learning unit itself is likely to be congested or not to the argument $x_{s+1}$. The predicting unit selects the path that is not congested among the return values $y_{s+1}$, and forwards the traffic.

[Route Control Method]

Figure 4:
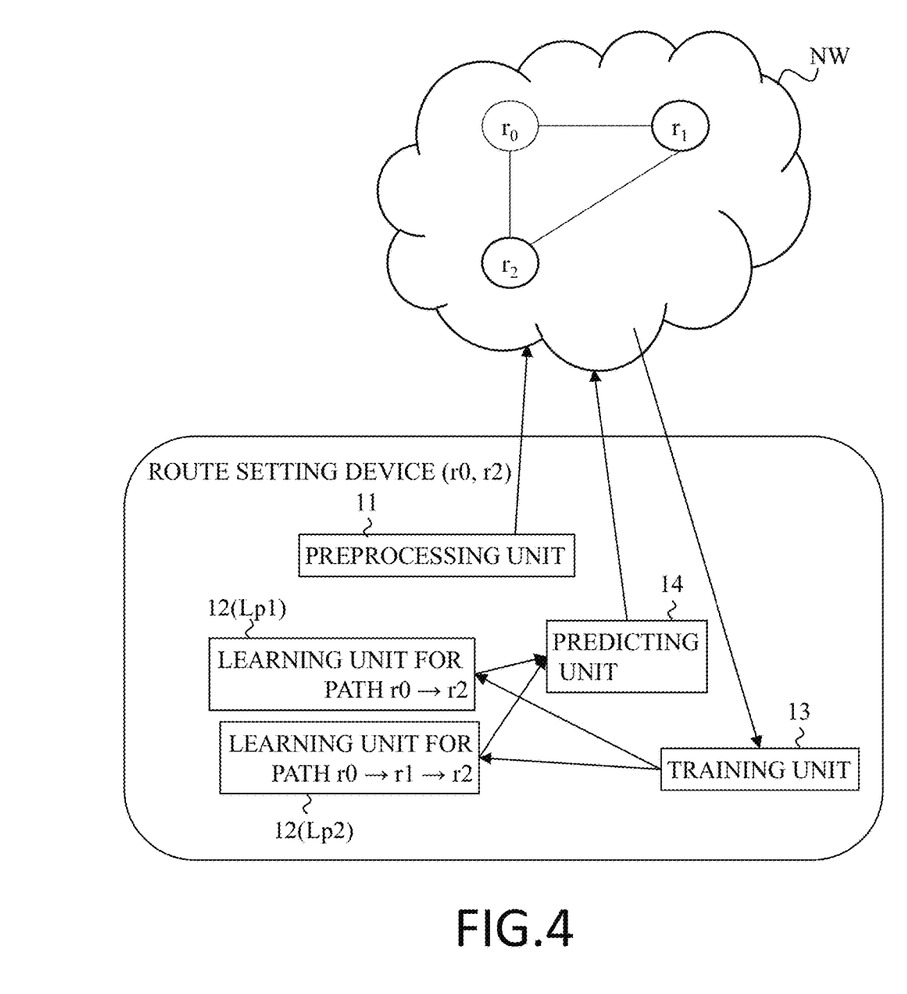
FIG. 4 is a block diagram describing the route setting device according to the present invention.

FIG. 4 is a block diagram describing the route setting device of this embodiment. This route setting device includes:

a learning unit 12 prepared for each path set for each router ($r_0, r_1, r_2$) in a communication network NW;

a training unit 13 configured to collect traffic information of every router and congestion information of a path currently forwarding a packet and add to accumulation of the past traffic information and the past congestion information of each of the set paths, and train each of the learning units having the accumulation as teacher data; and a predicting unit 14 configured to give the traffic information to every learning unit 12 and perform a path prediction setting to set one path predicted not to be congested among congestion predictions output from the learning unit 12 for the router.

Note that a preprocessing unit 11 configured to set a shortest path as an initial value may be included together with the learning units 12 prepared for the respective paths set for the respective routers in the communication network NW.

The route setting device of this embodiment ensures a route control method to early identify and avoid the congestion state of the network through real-time learning. This route control method includes:

a preprocessing step of setting a path for each router ($r_0$, $r_1$, $r_2$) in a communication network NW to prepare a learning unit 12 for each of the paths;

a training step of collecting traffic information of every router and congestion information of a path currently forwarding a packet and adding to accumulation of the past traffic information and the past congestion information of each path set in the preprocessing step, and performing machine learning with the learning unit 12 of each path having the accumulation as teacher data; and a predicting step of setting one path predicted not to be congested among congestion predictions based on results of the machine learning performed to the given traffic information in the training step for the router.

Figure 3:
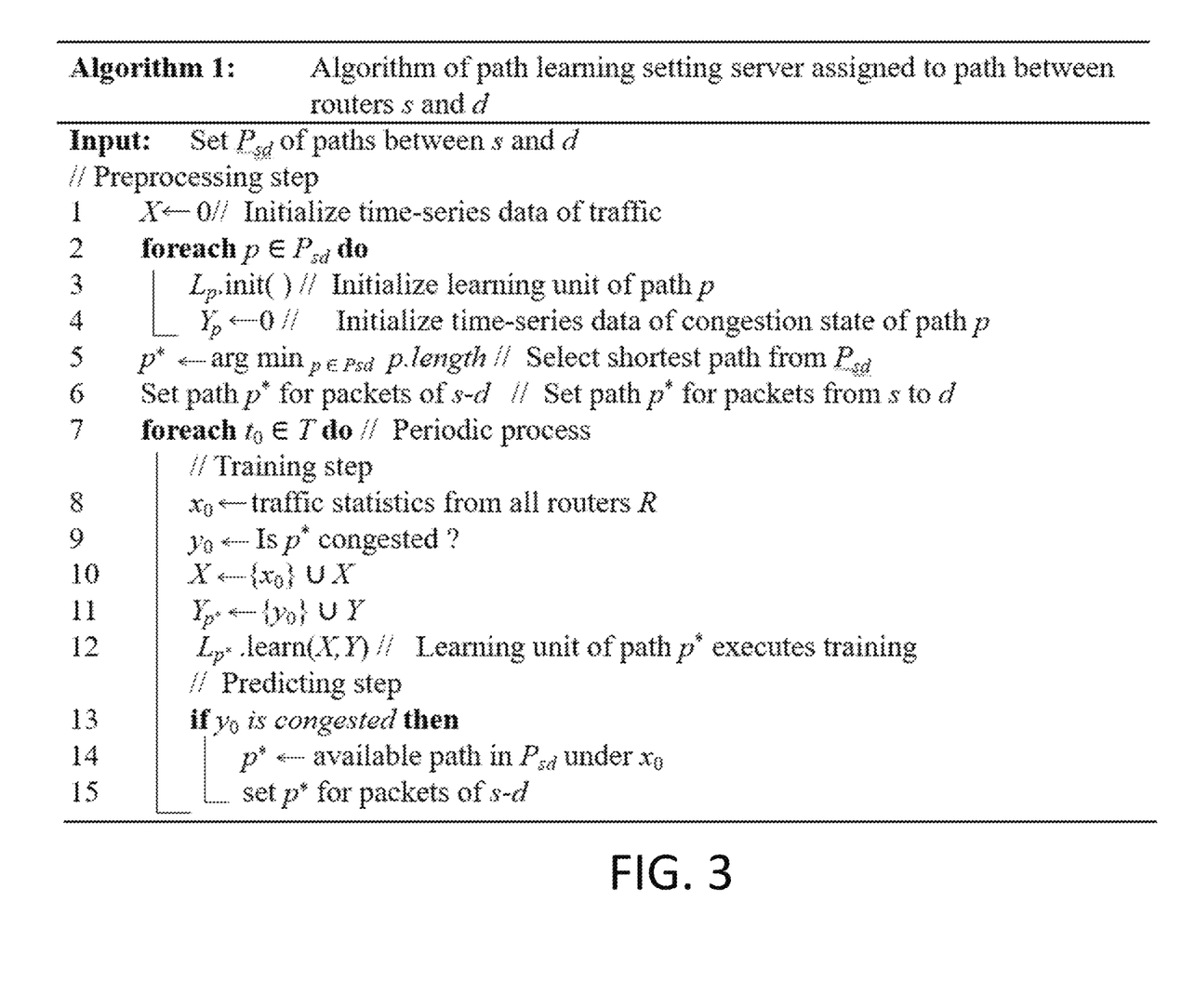
FIG. 3 is a drawing describing a route control method according to the present invention.

FIG. 3 illustrates an algorithm describing this route control method. The 1st to the 6th lines are the preprocessing step, the 8th to the 12th lines are the training step, and the 13th to the 15th lines are the predicting step. Note that the training step and the predicting step are repeatedly executed.

In an initializing step, time-series data of the traffic and the congestion state is initialized (1st and 3rd lines, respectively). The learning unit is also initialized. At this time, the processes are performed to the learning unit and the congestion state for each path. Subsequently, the shortest path is selected at the 5th line, and the path is set for each router at the 6th line so as to forward the packet along the selected path.

In the training step, the traffic information and the congestion state at that time point are obtained (8th and 9th lines) and added to the past time-series data (10th and 11th lines). At the 12th line, the time-series data is used to retrain the learning unit.

The predicting step is executed when a currently used path p* is crowded (13th line). At the 14th line, the latest traffic information is used to select the path without the congestion. At the 15th line, that path is set for each router.

The following describes a specific example using the network of FIG. 4. While a description will be given of the route setting device assigned to the path from the router r0 to r2 here, the processes are similarly performed between other routers.

(1) Preprocessing Step

The preprocessing step is a step performed by the preprocessing unit 11.

Two paths between r0 and r2 are defined as p1 and p2, and p1: r0->r2 and p2: r0->r1->r2 are each satisfied. The route setting device assigned to the paths between r0 and r2 creates a path set $P_{r_0 r_2}=\{p1,p2\}$. In this embodiment, the number of routers in the communication network is set to three for description, but the process is similarly performed when the number of routers is four or more. Increase of the number of routers increases the number of paths, and increases the number of learning units. While the preprocessing unit 11 includes both two paths between r0 and r2 in the set $P_{r_0 r_2}$ here, when the number of routers is large, a part of the paths may be excluded with a restriction such as setting an upper limit on the path length (on only main paths, the following steps are performed).

The time-series data of the traffic is defined as X, and initialized with an empty set φ.

For the two respective paths, the learning units 12 (Lp1 and Lp2) are prepared, and an initialization process is performed as necessary. The specific process is omitted because it varies depending on implementation of the machine learning.

For each of the two paths, the time-series data Yp1 and Yp2 in the congestion state are prepared and initialized with φ.

The shortest path p1 is selected from the path set $P_{r_0 r_2}$, and set to the path of the packet from r0 toward r2. Specifically, setting r2 for the router r0 on the path as a next hop causes the packet to be forwarded along p1.

After this, the training and predicting steps are repeated every second.

(2) Training Step

The training step is a step performed by the training unit 13.

Figure 5:
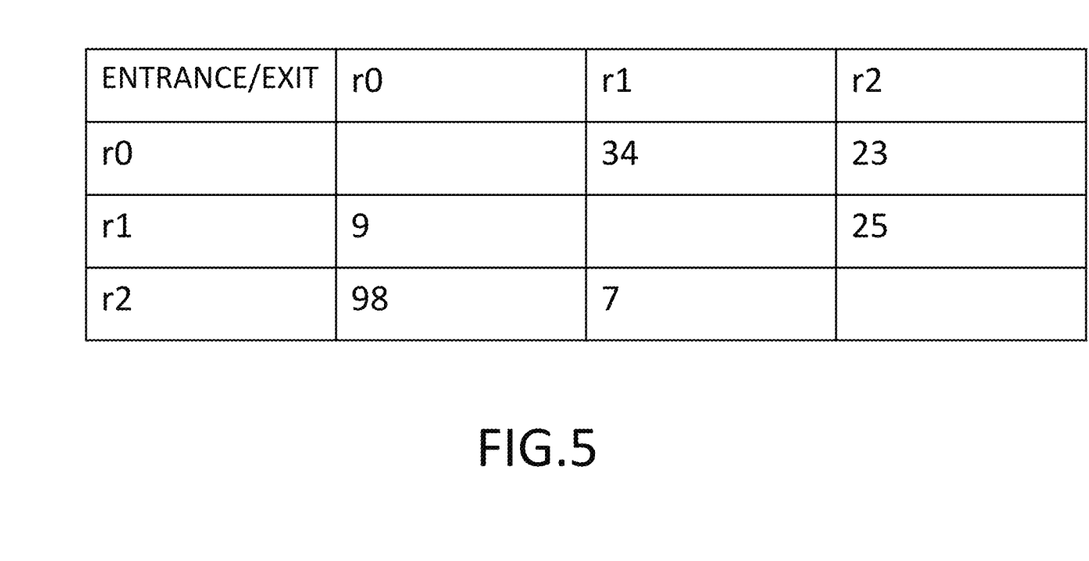
FIG. 5 is a drawing describing traffic information used by the route setting device according to the present invention.

When a predetermined time (for example, first one second) has elapsed, the training step is started. The traffic information is obtained from all of the routers r0, r1, and r2. Here, only the number of arrival packets is taken into account as the traffic information, and assume that information x0 as illustrated in FIG. 5 is obtained. FIG. 5 means, for example, the arrival of 34 pieces of packets from r0 to r1 (the arrangement of the table of FIG. 5 is the row of $t_0$ in $c_0$ of FIG. 1). This traffic information is added to the time-series data X of the traffic. The traffic information is used by all the route setting devices in common.

Next, the training process of the route setting device between r0 and r2 will be described.

Currently, p1 is used as the path between r0 and r2. Then, the congestion state of the packets that has passed through p1 is obtained. Here, whether a passing time exceeds 1 ms or not is the reference of the congestion. An entrance router r0 writes a time stamp to the packet and an exit router r2 calculates a difference from a current time, thus measuring the passing time. In addition to this method, a method to estimate from the queue length of the router and similar method can be used. Here, assume that p1 is congested. This congestion state is added to time-series data Yp1 of p1.

Using X and Yp1, the learning unit 12 (Lp1) is trained. The specific process is omitted because it varies depending on implementation of the machine learning.

(3) Predicting Step 1

The predicting step is a step performed by the predicting unit 14.

When the path p1 in use is congested, the predicting step is executed. First, the learning units of the paths other than p1 are caused to predict the congestion state using the current traffic information x0. Here, the learning unit 12 (Lp2) of the path p2 is caused to perform the prediction. The learning unit 12 (Lp2) is in an initial state where the training has not yet been performed, and assume that a result of "not congested" is returned in the initial state.

Note that in an early stage of the operation, to sufficiently train every path, the path predicted as the congestion is purposely selected in some cases. For example, with a preliminarily set probability ε, the path is randomly selected regardless of the congestion state (ε-greedy method).

The predicting unit 14 sets p2 predicted not to be congested to the path of the packet from r0 toward r2. Specifically, r1 is set for r0 as the next hop and r2 is set as the next hop of r1.

(4) Predicting Step 2

Assume that the training and predicting as described above are repeated for a while (for example, about 600 seconds) and the two learning units 12 (Lp1, Lp2) are trained several times. Assume that at this time point, the packet from r0 toward r2 has used the path p1. The training step of each learning unit 12 is omitted because it is identical to the above description, and the following describes the predicting step after the training.

Since the path p1 in use is congested, the predicting unit 14 executes the predicting step 2. First, the learning units of the paths other than p1 are caused to predict the congestion state using the traffic information x0 at that time point. Here, the learning unit 12 (Lp2) of the path p2 is caused to perform the prediction. As a result, the learning unit 12 (Lp2) makes a prediction of not congested.

The predicting unit 14 sets p2 not to be congested to the path of the packet from r0 toward r2. Specifically, r1 is set for r0 as the next hop, and r2 is set as the next hop of r1.

(5) Effects

Performing the predicting step for each path forwarding the packet provides the accurate function form of the learning unit 12 of each path. Therefore, the congestion state due to a sudden traffic, which an existing routing protocol such as OSPF cannot avoid, can be detected and predicted through online learning. Then, setting the path to avoid the congestion ensures reduction of a network delay and a packet loss rate.

Figure 6:
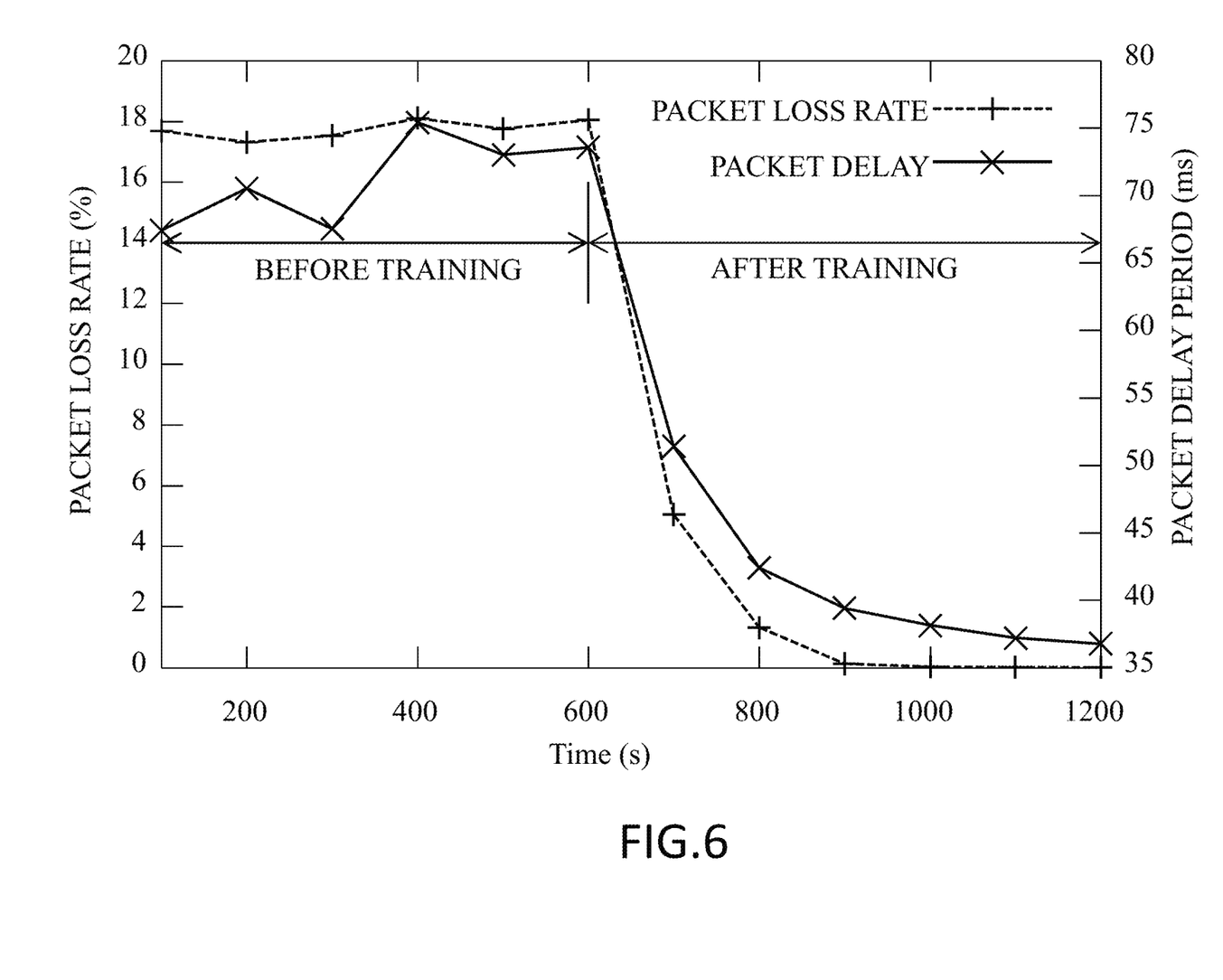
FIG. 6 is a drawing describing a learning effect by the route setting device according to the present invention.

FIG. 6 indicates the result of a numerical experiment performed on a network including nine routers. It is seen that the learning accuracy sufficiently increases while the packet loss rate and the delay period significantly decrease around 600 seconds. Note that when the network scale is large, the learning speed of the learning unit can be improved by the use of deep learning technology.

While the configuration where one route setting device controls the communication network NW as illustrated in FIG. 4 has been described in this embodiment, the present invention is not limited to this configuration. Any of the routers may include the preprocessing unit 11, the learning unit 12, the training unit 13, and the predicting unit 14 and exchange the information among the routers to control the paths of the communication network NW. The routers may each include the preprocessing unit 11, the learning unit 12, the training unit 13, and the predicting unit 14 and exchange the information among the routers to autonomously control the paths of the communication network NW.

DESCRIPTION OF REFERENCE SIGNS

11 Preprocessing unit
12 Learning unit
13 Training unit
14 Predicting unit
NW Network

The invention claimed is:

1. A route control method comprising:
preparing learning units for each of a plurality of paths having a source point router and a destination point router as an identical router in a communication network including a plurality of routers;
accumulating, in the learning units prepared in each of the plurality of paths, traffic information of all of the plurality of routers in the communication network and congestion information of the each of the plurality of paths, wherein the traffic information includes a queue length, a number of packet arrivals, and a packet discard rate of each of the plurality of routers;
performing machine learning for the each of the plurality of paths using the accumulated traffic information and the accumulated congestion information as teacher data, wherein the machine learning is performed by the learning units;
performing congestion prediction based on results of the machine learning for the current traffic information, the congestion prediction being performed by each of all the learning units; and
setting one path predicted not to be congested for a path from the source point router to the destination point router.

2. The route control method according to claim 1, wherein a shortest path is selected among the plurality of paths to start the machine learning, and the machine learning and the congestion prediction are repeated for a predetermined time.

3. The route control method according to claim 2, wherein a path other than the one path predicted not to be congested for the predetermined time with a predetermined probability is set for a path from the source point router to the destination point router.

4. A route setting device comprising
learning units prepared for each of a plurality of paths having a source point router and a destination point router as an identical router in a communication network including a plurality of routers, wherein
the learning units prepared in each the plurality of paths:
accumulates traffic information of all of the plurality of routers in the communication network, and congestion information of the each of the plurality of paths, wherein the traffic information includes a queue length, the number of packet arrivals, and a packet discard rate of each of the plurality of routers, and
performs machine learning for the each of the plurality of paths using the accumulated traffic information and the accumulated congestion information as teacher data, and
each of all the learning units:
performs congestion prediction based on results of the machine learning for the current traffic information, and
sets one path predicted not to be congested for a path from the source point router to the destination point router.

5. The route setting device according to claim 4, wherein the learning units select a shortest path among the plurality of paths to start the machine learning, and the machine learning and the congestion prediction are repeated for a predetermined time.

6. The route setting device according to claim 5, wherein the learning units set a path other than the one path predicted not to be congested for the predetermined time with a predetermined probability fora path from the source point router to the destination point router.

* * * * *